March 2, 1943. W. F. OCENASEK 2,312,356
RADIAL SAW
Filed Aug. 31, 1939 3 Sheets-Sheet 1

INVENTOR
William Ferdinand Ocenasek
BY
Albert F. Nathan
ATTORNEY

March 2, 1943.  W. F. OCENASEK  2,312,356
RADIAL SAW
Filed Aug. 31, 1939    3 Sheets-Sheet 2

INVENTOR
William Ferdinand Ocenasek
BY
Albert F. Nathan
ATTORNEY

March 2, 1943.　　W. F. OCENASEK　　2,312,356
RADIAL SAW
Filed Aug. 31, 1939　　3 Sheets-Sheet 3
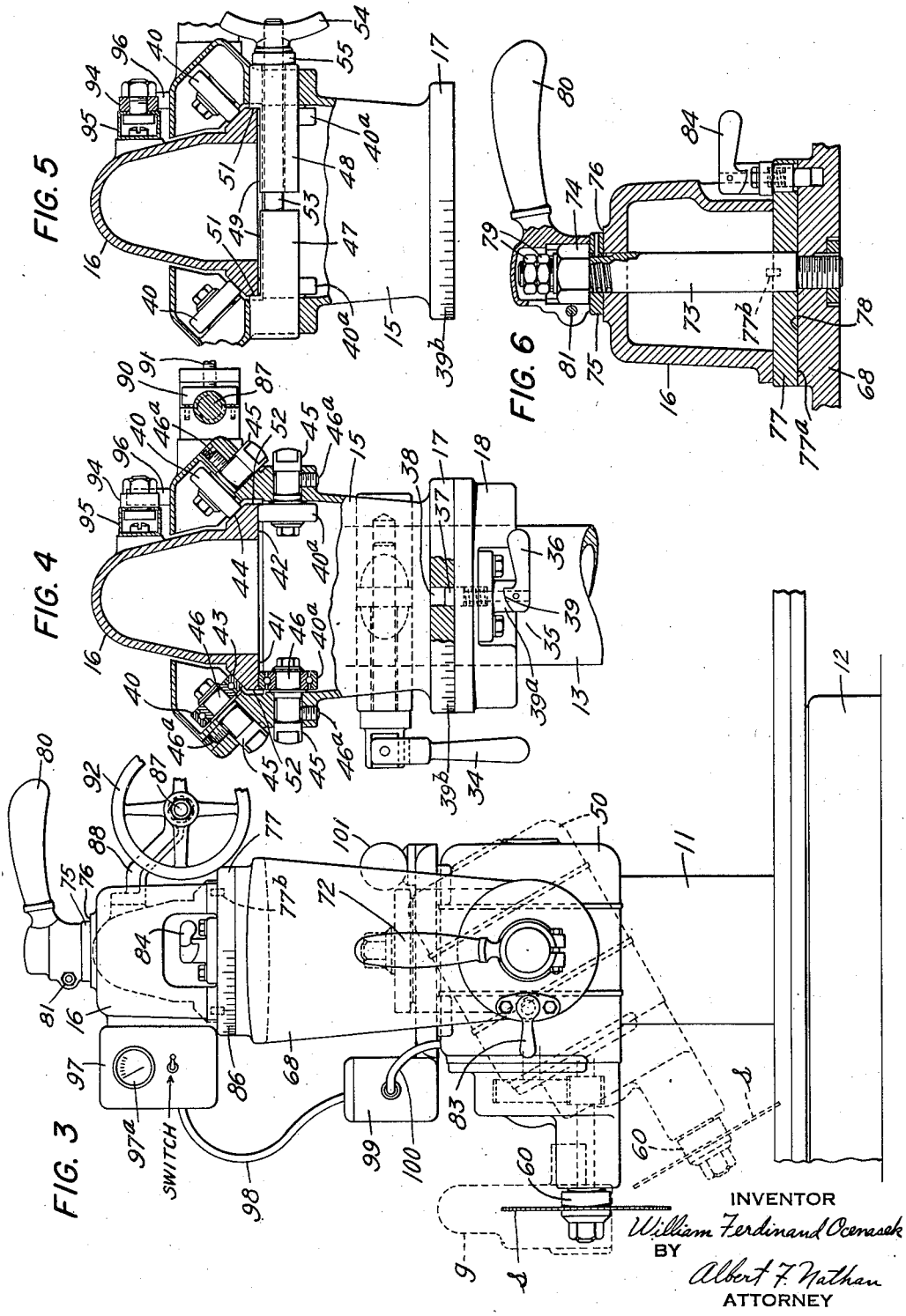
INVENTOR
William Ferdinand Ocenasek
BY
Albert F. Nathan
ATTORNEY Patented Mar. 2, 1943

2,312,356

UNITED STATES PATENT OFFICE 2,312,356

RADIAL SAW

William Ferdinand Ocenasek, Plainfield, N. J., assignor to Walker-Turner Co. Inc., Plainfield, N. J., a corporation of New York Application August 31, 1939, Serial No. 292,827

6 Claims. (Cl. 143—6)

The present invention relates to machine tools and concerns more particularly motor driven tools of the radial type. It has for a primary object to overcome inherent disadvantages and limitations as to features of construction, use, and place of use, that are encountered by the manufacturer and use of the prior types of radial structures.

A further aim of the invention is to provide a compact self-contained machine, portable in its nature, which may be transported from one location to another and which when set up for operation, provides the user with the ready equivalent of a large number of machines, for example, a saw, a routing, grooving or shaping machine, and at the same time, give the user an accurate indication of the power available at the machine so that tasks beyond the service available and likely to cause injury to the machine will not be attempted.

Still another objective of the invention is to improve the tool mounting and drive whereby it and the tool spindle and drive may be removed as a unit and replaced by a complete power unit of a different style or capacity, and which when mounted in the frame of the machine may be moved through an arc of 360° in transverse vertical planes, and also in a horizontal plane about a vertical axis, to the end that the user may position the axis of the tool and/or its line of movement in any one of an infinite variety of positions with respect to the workpiece, as the needs of the operation may require.

The invention further aims to eliminate vibration in machines of this character and to render available a radial power tool embodying strength, rigidity, and a high degree of accuracy, together with a measure of versatility and adaptability for a large variety of different operations that heretofore has neither been approached nor attained with the prior devices.

Still another object of the invention is to minimize operating fatigue in the use of a radial tool by providing relatively large bearing surfaces and bearings widely spaced so as to afford relatively free and easy movement, free from binding of the parts. And to arrange the bearing surfaces so as to render it practical to conveniently effect firm clamping of the several parts whenever it is desired to lock the elements in a given position or to maintain a predetermined relation between the tool and the workpiece. As an additional improvement the invention proposes, in combination, a clamping arrangement whereby the action of clamping does not destroy or upset the adjustment or alignment made when the parts were free.

A further objective of the invention is to render available a convertible machine tool of the radial type consisting of the fewest number of parts, each designed and related so that the forces of gravity and of the tooling operation complement one another and are distributed over relatively large and widely spaced bearing surfaces. The object being to build into the structure of a radial machine a means for effectively supporting and bracing the tool in all of its normal operating positions and to so relate the supporting surfaces that they mutually contribute to prevent bending or straining of the parts out of their original alignment.

In carrying forward the aims and objectives of the invention, it is proposed to provide a large sturdy base member, one portion of which is to form the support for the workpiece to be operated upon, and another and integral part thereof, a support for an upstanding vertically adjustable column. An angularly adjustable and radially movable tool supporting ram member is mounted at the top of the column in anti-friction bearing means, widely spaced both longitudinally of the ram and transversely thereof.

The bearings are placed at opposite sides of the axis of the column and at opposite sides of the longitudinal axis of the ram thereby providing at least four points of bearing and each point of bearing comprising at least two roller bearings so related that one takes the downward thrusts, and the other takes the resultant of the combined upward and lateral thrusts. The eight roller bearings provide four guideways for the ram and each bearing is individually adjustable to compensate for wear and to make it possible to initially assemble and accurately level and align the ram with respect to the work supporting surface of the machine.

The forward end of the ram carries a depending indexible yoke member which receives in its bifurcation a second but pivoted yoke member, the axis of which is transverse the axis of swivel of the first mentioned yoke. The inner pivoted yoke is fashioned to provide a supporting platform of ample area for a changeable unitarily constructed drive motor and tool spindle assembly, all of which may be revolved within the indexible yoke.

With such a mounting, the drive unit is supported at both of its sides and the whole assembly may be tilted in an arc to position the tool spindle in a plane parallel, perpendicular, or at an intermediate angle with respect to the surface of the workpiece. In the case of a power saw, the plane of the saw may be inclined with respect to the plane of the workpiece, and if also placed parallel to the ram guides, the entire assembly may be drawn across the workpiece to cut a bevel thereon. Similarly, by revolving the saw and drive assembly 90° about a vertical axis and by clamping the ram in a given position, the workpiece may be fed to the saw in the cutting of a bevel on the longitudinal edge thereof.

Routing and shaping operations are conveniently performed by positioning the drive spindle vertically or at any other desired angle. By substituting the proper form of tool and by moving either the workpiece to the tool or the tool to the work, an extensive variety of sawing, routing, shaping and analogous operations may be performed.

Movement of the tool through or across the work is conveniently effected at a relatively rapid rate by a dual function handle at the front of the machine, or at a slow positive rate by a separate and independently operated hand screw. Adjustable stops are provided for limiting the stroke of the ram, and a differential clamp that does not place an unbalanced stress on the ram is provided for securely clamping the ram in a definite position.

Substitution of a power unit of different capacity or character is conveniently accomplished with the present invention, by the provision of a plurality of adapter plates, each of which may be secured fast to a given power assembly and each provided with a common device, for example, a single bolt and locating pin, by means of which the assembly may be quickly located and secured in a definite position to the transverse double-hung shelf of the tilting yoke.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which—

Fig. 3 is a front view of the machine.

Fig. 4 is a vertical sectional view through the ram and a portion of its mounting illustrating more clearly the arrangement and relation of the adjustable roller guides.

Fig. 5 is a view similar to Fig. 4 but illustrating more clearly a differential clamp means for the ram.

Fig. 6 is a detail sectional view of a portion of the tool support and its pivotal mounting to the end of the ram.

Figure 1:
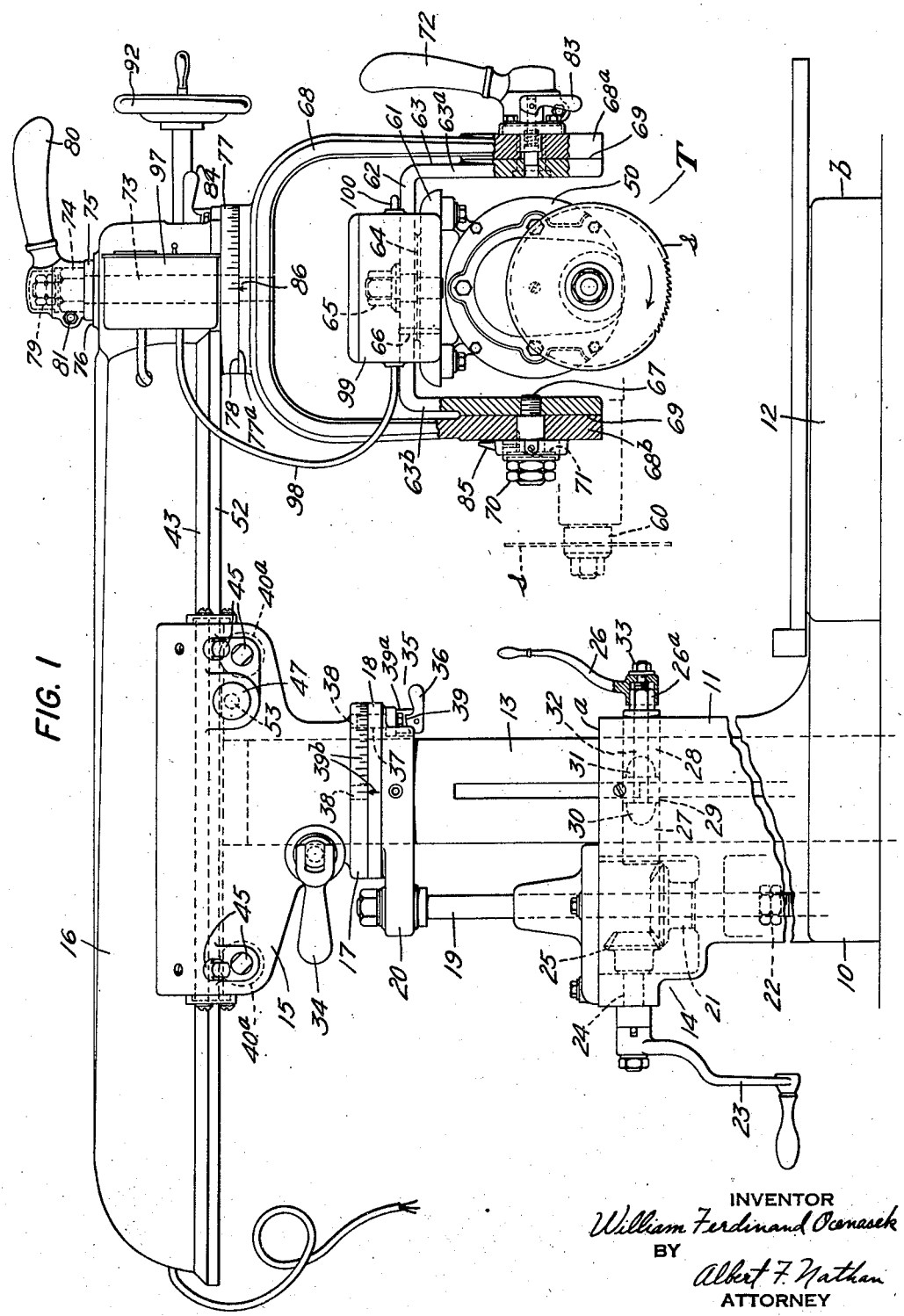
Figure 1 is a side view of a radial machine tool embodying the invention.

Referring more particularly to Figure 1, the machine illustrated comprises a base 10 which extends preferably from the top $a$ of the post 11, to the front edge $b$ of the work or table supporting platform 12, as a single one-piece unit. A cylindrical column 13 is splined to the interior of the post 11 and is adapted to be vertically adjusted therein by means of the elevating mechanism indicated generally as 14. The top of the column 13 has mounted thereon an angularly adjustable cradle or T-shaped head 15 that supports a rectilinearly tool carrying ram 16. The lower portion of the cradle 15 is flanged, as at 17, and seats upon a ring 18 that is secured in fixed relation to the column 13.

One end of a column elevating screw 19 is non-rotatably secured to a lateral ear 20 of the ring 18 and, by means of a gear driven nut 21, the column, cradle, and ram may be raised or lowered. Fig. 1 of the drawings illustrates this mechanism revolved out of place relative to the normal position illustrated in Fig. 2. The hand crank 23, operating through shaft 24 and gear 25, is provided for actuating the elevating nut 21 and adjustable stop nuts 22 carried by the screw 19 limits the extent of the upward movement.

When the column and parts supported thereby have been adjusted to the desired position relative to the base, the clamp lever 26 may be operated to clamp the column firmly to the post. The column clamp comprises essentially two relatively movable plungers 27, 28 slidably mounted in a transverse, tangentially arranged bore 29 formed in the post. The adjacent ends of the plungers are spaced a little distance apart and have their column engaging sides flattened as at 30, 31 so as to present a beveled surface to contact with the cylindrical surface of the column. The plunger 27 is formed with a reduced shank 32 that extends through the plunger 28 and which is threaded at its outer end to receive a nut portion 26$^a$ of the lever 26. The bevel portions 30, 31 of the plungers that engage the column, restrain the plungers against turning, so that angular movement of the lever 26 urges the two plungers 27 and 28 toward each other thereby causing the bevel portions 30, 31 to impinge upon the column 13. Movement of the lever 26 in the unclamping direction causes a reverse action to occur and the column is free to be adjusted vertically. A check nut 33 is applied to the outer end of the plunger shaft 32 to confine the angular movement of lever 26 within a conveniently operable range.

A similar clamp means 34 is provided between the cradle 15 and the upper end of the column. The only difference in the two clamps being that the clamp 34 has a hinged handle and screws into the far plunger and is used to prevent relative rotation between the cradle 15 and the column 13, whereas, the handle of the column clamp has a threaded engagement with its shaft and the clamp is used to prevent relative translation between the column and post. In both instances, however, the clamp plungers are free to float axially so as to produce a uniform and equalized clamp action.

Normally, the rectilinear motions of the ram will be confined to a predetermined line radial from the column and additionally locked by a cam operating spring pressed latch pin mechanism 35. This mechanism includes a lever 36 secured to one end of a rotatable latch pin 37 which, in turn is adapted to engage with one of the series of spaced holes 38 formed in the flange 17 of the cradle. The plunger end of the lever 36 is formed with a helically shaped cam 39 which cooperates with a similarly inclined surface of the supporting bracket 39$^a$ so that a turning of the lever angularly, simultaneously withdraws the pin 37 from the hole 38, and providing the clamp 34 is released, the radial position of the ram may be changed. Radial positions intermediate the spacing of the holes 38 are determined by the scale and pointer 39b.

As herein before indicated, the radial arm or ram 16 of the machine is movable longitudinally in the cradle 15, and so that it may be moved with minimum effort while at the same time be accurately guided and supported in all of its positions, and improved bearing means have been provided. A preferred form of bearing means comprises a series of roller bearings 40, 40a arranged in pairs or sets of two each, and each set being mounted in a corner of the cradle 15. Figs. 1 and 4 illustrate more clearly this preferred location of the bearings so as to afford widely spaced regions of bearing both longitudinally and transversely of the ram 16.

The lower bearings 40a underlie and engage the lower machined surfaces 41, 42 of the ram, and the upper bearings 40 engage the bevelled surfaces 43, 44 of the ram. The planes of the surfaces 43, 44 are at an angle of approximately 45° from their respective related surfaces 41, 42, thus forming dove-tailed guideways along the lower edges of the ram. Each of the rollers 40, 40a is journaled on an axis paralleling the plane of the surfaces it engages, each pair forming a V, and apposed pairs forming a dovetail roller guide. The construction is such that the lower spaced rollers carry the downward thrusts, and the upper rollers carry the upward thrusts as well as the lateral thrusts.

Each roller bearing is journaled on a short stub shaft 45 whose end portion 46 (that receives the roller bearing) is formed eccentric to the axis of the main shaft 45. Consequently, the turning of the shaft 45 angularly in its support in the cradle effects a moving of the roller bearing toward or away from its associated bearing surface of the ram. A clamp means 46a is provided for holding each bearing in adjusted position.

This construction possesses many advantages among which may be noted that bearing surfaces 41, 42 need not be precision scraped in identically the same plane, so likewise with surfaces 43, 44, these need not be finished to lie precisely the same distances from the ram center line. Parallelism is the only requirement and on assembling rollers 40, 40a adjusted into bearing contact. Moreover, as it is practically impossible to machine dovetail guideways perfectly parallel and at the same time at a perfect right angle with respect to the column 13, the adjustability of the roller bearings permits the cradle and ram of the machine to be manufactured at a minimum expense and the ram assembled therein and levelled and aligned with precision in vertical and horizontal planes. A primary purpose, however, is to enable the user by adjusting the roller bearings away from the ram ways, to increase its freedom of movement, or by adjusting the rollers toward the ram ways, to compensate for wear and to obtain any desired degree of tightness in the ram mounting as a whole.

The forward end of the ram is adapted to support a universally mounted power tool T, which may be moved across the workpiece, or clamped in a fixed position and the workpiece fed to the tool. Clamping of the tool in a fixed position radially of the column should be effected without placing undue stress upon the ram such as would upset its alignment or overloading one or more of the roller bearings. A preferred form of clamp for this purpose is illustrated more clearly in Fig. 5 which comprises two axially movable plungers 47, 48 journaled transversely in the cradle and preferably at a point intermediate the end-sets of roller guides. Each plunger is formed with a flat portion 49 on its upper surface which extends a part of the length thereof leaving shoulders 51 arranged to contact with the side surfaces 52 of the ram. The plunger 47 is formed with a shaft 53 which extends through the plunger 48 and is threaded at its outer end to receive a clamp screw 54. The clamp screw, operating through a washer 55, exerts a force upon the plunger 48 and tends to move the plunger toward the other plunger 47; meanwhile plunger 47 is being urged toward the plunger 48. Shoulders 51 on the respective plungers are thereby caused to engage, in an equalizing manner, the side faces of the ram, irrespective of the lateral or vertical position of those faces relative to the center of the machine. By this construction, both plungers 47 and 48 are free to float endwise in their journals until clamping at both sides of the ram is effected with a uniform degree of pressure. Thus, there are no unbalanced side thrusts upon either the ram or its roller bearing supporting means and the ram may be clamped securely in position without danger of its being thrown out of alignment.

The tool unit carried at the forward end of the ram may be a power saw as represented in the drawings, a routing unit, a grinder or the like, and consists essentially of a motor 50 geared directly to an offset mandrel 60. The geared and offset mandrel lends efficiency and compactness to the unit and at the same time enables the user to mount thereon saws or wheels of smaller diameter and to use them effectively without severe restrictions incident to other forms of drive. When desired or necessary a dust chute and guard g (illustrated in dotted lines in Fig. 3), may be mounted upon the mandrel support.

As seen more clearly in Fig. 1 of the drawings, the motor 50 is secured to adapter plate 61 which in turn is detachably secured to a transverse bridge portion 62 of a pivoted yoke 63. The adapter plate forms, in effect, a part of each insertable power unit, which may be square or round as the case may be, and is provided with a relatively large bearing surface 64 that fits to a similar surface of the bridge portion 62. Clamp means, such as a bolt and nut 65, accessible and operable from the opposite side of the bridge, is provided for securing the power unit in place within the yoke 63. One or more dowel pins 66, similarly located in all of the adapter plates, are provided for quickly locating a given power unit in correct alignment.

The yoke 63 is formed with two arms 63a, 63b, depending from the bridge portion on opposite sides of the power unit, and which are pivoted at the axis 67 to extending arms 68a, 68b of a swivel yoke 68. Relatively large annular bearing surfaces 69 are provided between the adjacent faces of the yoke arms 63a and 68a and 63b, 68b to effect a firm mounting of the tilting yoke 63 within the swivel yoke 68. Two of the arms of the yokes, preferably the pair that normally will be adjacent the motor unit and the column of the machine, are clamped together under a fixed tension produced by the clamp nut 70 and spring 71. The pair of arms on the opposite side of the tool unit are adapted to be clamped together by means of a manual lever 72 which serves also as a handle for translating the ram and tool assembly as a unit in a radial direction.

The swivel yoke 68 is suspended from the outer end of the ram 16 by a draw bolt 73. The bolt 73 is threaded or otherwise secured to the yoke 68 and passes through the ram 16 and is provided at its upper end with a nut 74 which, acting through a washer 75, reacts against the upper surface 76 of the ram. A large annular bearing plate 77 affording a large surface 77a is secured to the underside of the ram by pins 77b and complemental bearing surface 78 is formed at the upper portion of the yoke 68. Normally the clamp nut 74 holds the bearing surfaces 77 and 78 in contact but not, however, with sufficient pressure to prevent swiveling of the yoke 68 and power unit supported thereby. When it is desired to clamp the yoke 68 in a definite angular position the nut 74 is given a part turn in a clamping direction thereby increasing the pressure on surfaces 77 and 78 and effecting a firm clamping of the parts. A pair of check nuts 79, threaded to the end of the central shaft 73, are provided for limiting the movement of the nut 74 in an unclamping direction, to definite limits. See Fig. 6. A clamping lever 80 of the socket type is fitted to the hexagonal nut 74 at an angle convenient for easy manipulation and is clamped thereto by a clamp screw 81. The yoke clamp and combination handle and clamp lever 72 therefore, previously referred to, are constructed similar to the clamp 74 and need not be described in further detail.

The angularity of the inner yoke 63 relative to the outer yoke 68, and the angularity of the swivel yoke 68 relative to its mounting on the ram, is determined by cam operated latch pin mechanisms 83, 84, respectively, which are constructed in a manner similar to indexing pin and lever 36, 37 previously described in respect to the indexing of the ram cradle 15 relative its support 18. Positions intermediate the predetermined angles of adjustment obtainable by the latch pin mechanisms 83, 84, may be obtained by reference to pointer and scale mechanisms 85, 86.

Certain uses of the machine herein described will require a relatively slow and controlled feeding movement of the tool, and so that such a slow feed may be imparted thereto, a hand operated feed screw 87 is provided. The hand screw is journaled against translation relative to the ram 16, in bearings 88 and 89, and cooperates with a releasable half-nut 90 adjustably mounted upon the ram cradle 15. A screw 91 is provided for engaging or disengaging the nut from the shaft 87 and for adjusting the nut to compensate for slight changes in the position of the shaft incident to making an adjustment in the alignment of the ram. Operation of the hand wheel 92, located at the front of the machine, may thus be caused to feed the ram and tool unit T, slowly through the workpiece. Preferably acme threads are provided on all the clamps and adjusting shafts of the machine to promote ease in operation with minimum wear. Adjustable dogs 93, 94, slidable in a ram carried channel 95, in cooperation with a fixed lug 96 on the cradle have been provided for limiting the stroke of the ram (and tool) to preselected distances relative to the work table or workpiece thereon.

Figure 7:
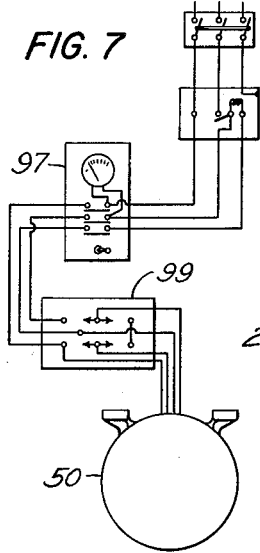
Fig. 7 is a wiring diagram of a typical motor circuit.

Power to the tool unit is conducted, preferably through the interior of the ram 16, to a voltage indicator and switch box 97 mounted on the ram, and thence through conduit 98 to a converter box 99 mounted on the inner yoke member 63. From the converter box 99, motor leads 100 convey the power to the motor and capacitor unit 101 and motor. The purpose of the converter box 99 is that the machine may be initially wired, up to that point, for a plurality of types of motors, and within the box 99 terminals are so arranged that connections may readily be made for various types of motors depending upon the requirements of the user and the service available. The diagrammatic Fig. 7 illustrates the circuit for a single phase, one horse power motor built to operate on either 110 V. or 220 V. current. However, with any given motor, its circuit will be interconnected with the indicator 97a (Fig. 3) so that the user may ascertain the line voltage being delivered to his machine. The portability of a machine of this character, renders such a device exceptionally useful, particularly on building projects and in rural districts, where the electrical service is likely to be of varying quantity. Knowing, however, the line voltage available at the machine, the operator thereof is in a position to known which of his power units to attach and/or to what extent he may safely load a given power tool.

*Operation*

Figure 2:
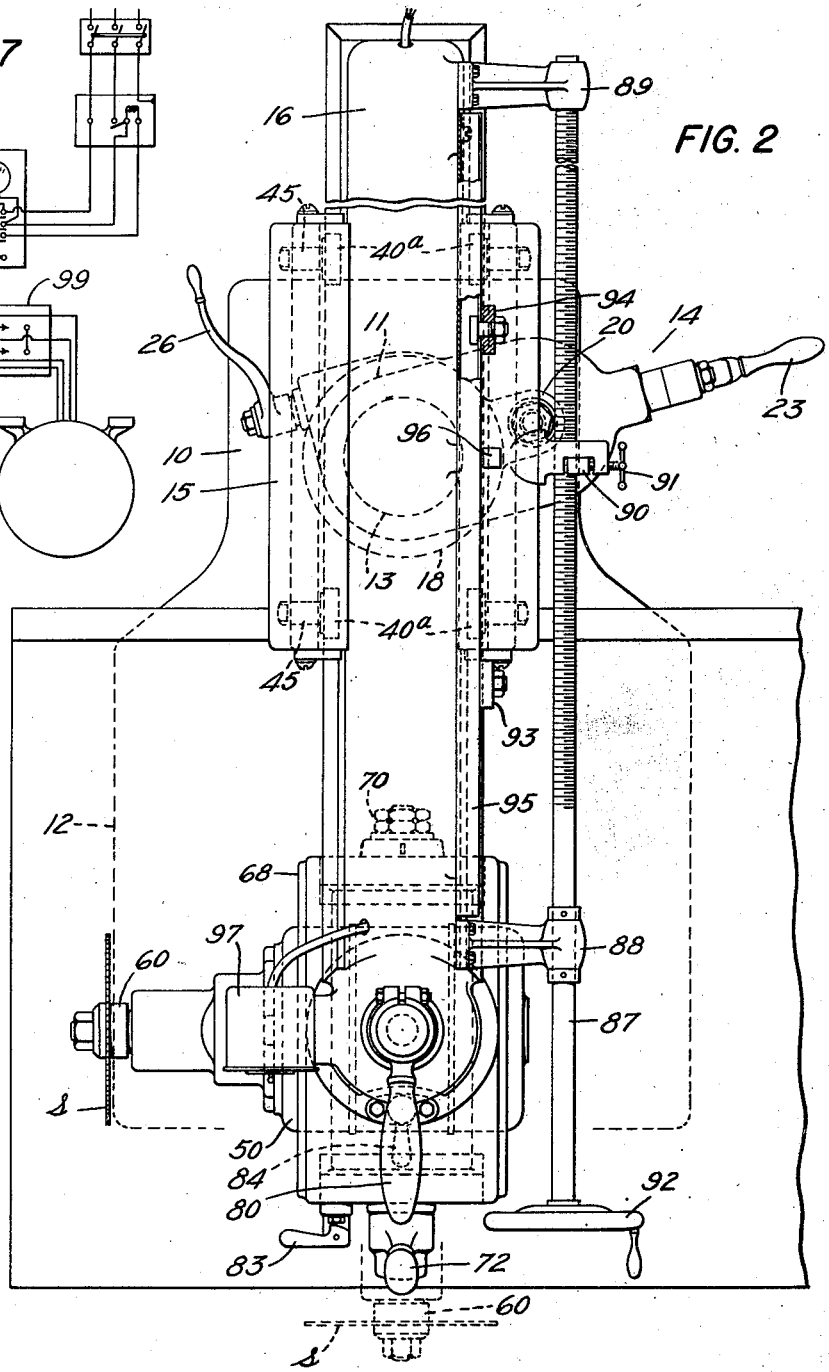
Fig. 2 is a plan view thereof.

In use, the machine will be set upon a bench or standard of convenient height in which there is an aperture for receiving the lower portion of the column 13. The column of the machine and all parts supported thereon will then be adjusted to the required height, and the power tool unit T adjusted angularly in the transverse planes afforded by the pivotal axes 67 and 73, to suit the nature of the tool and the particular operation to be performed thereby and clamped. For ordinary 90° cross cutting operations the saw s, for example, will be set in a vertical plane and parallel the axis of the ram as indicated in Figs. 2 and 3, and the cradle 15 clamped tightly in the 90° position illustrated in plan in Fig. 2. After connecting the power, the machine is ready to be operated by grasping the handle 72 and drawing the saw across the table. Normally the saw will rotate in the direction of the arrow (Fig. 1).

With the set-up just mentioned it will be observed that the reacting stresses of the tooling operation are transmitted to the inner yoke member 63, which inasmuch as it is firmly supported at both sides of the tool, effectively resists any turning tendency. Likewise, the relatively large bearing surfaces 77a and 78 between the outer yoke and the ram effectively resists any tendency to creep or turn, and the ram itself is prevented from lateral shifting relative to the cradle 15 by reason of the four widely spaced points of bearing afforded by the upper set of guide rollers 40. Any lifting or digging-in action of the tool during its progress through the workpiece is again resisted by the effectiveness of the double bearing surfaces 69 and of the clamp 72. Similarly, twisting effects induced in the ram are prevented, not only by reason of the channel-like structure of the ram itself (illustrated in Figs. 4 and 5), but also by the combined action of the upper and lower sets of rollers in engagement therewith.

When the saw is turned to the position illustrated in dotted lines in Fig. 1, which is customary in rip-sawing operations, the reacting forces are resisted by the large and spaced bearing surfaces in substantially the same manner.

In consequence of the herein described relation and relative location of the supporting and bearing surfaces, the tool is firmly and rigidly supported in all of its working positions.

When in use the ram 16, in effect, becomes an integral part of the power unit; there are no joints or pivots between the power unit and the ram likely to wear and give trouble during the use of the machine. And as the power tool is secured to the outer end of the movable ram, the ram itself acts as a counter-balancing medium and is never in the way to be a hindrance to the operator in using the machine or in the swinging or handling of workpieces.

Should the operator, after performing 90° sawing operations desire to make bevel cuts, the inner yoke 63 is unclamped and the complete unit swung about the axis 67 to the desired angle, as represented in dotted lines in Fig. 3. Ample space is provided within the yoke member 68 to enable the user to swing the unit completely therethrough to a vertical position, without interference. Single or compound angles may be cut by tilting the plane of the saw or by adjusting the radial position of the ram, or both, as the occasion requires. The machine as a whole is exceedingly compact yet eminently flexible to meet practically every need of the workmen, without sacrifice to rigidity or freedom of movement in its operation.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention, and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of the United States:

1. In a saw machine of the radial type having a longitudinally shiftable ram member, the combination of means for mounting a detachable power saw unit for adjustment in transverse planes to the forward end of said ram, comprising a two-armed yoke member swivel mounted to the ram at the forward end thereof, a second two-armed yoke member supported within said swivel yoke and having its arms pivotally connected to the arms of the swivel yoke with the axis of the pivot perpendicular to the swivel axis, said second yoke member having a substantially flat motor supporting platform bridging the arms thereof and laterally offset relative to the pivotal axis; means for detachably securing a unitary saw driving assembly to the said bridge portion of said second yoke whereby said assembly is effectively supported at both of its sides and revolvable bodily within the said swivel yoke; and clamp means for clamping said yokes in a preselected angularly adjusted position relative to each other and to the said ram.

2. The combination set forth in claim 1 in which said detachable securing means includes an adapter plate finished on one side to match the said bridge portion, and its other side finished to receive but one of a plurality of sizes or shapes of saw driving assemblies, and means for securing the said plate fixedly to the said assembly as to form a part thereof and thereafter the said plate with its assembly detachably to the bridge portion of said inner yoke.

3. In a machine tool of the radial type the combination of a base member, a column rising therefrom; a laterally extending and longitudinally shiftable ram member at the top of the column; a two-armed yoke member having its pintle journaled in the ram at the forward end thereof, said yoke having its arms extending toward the base, a second two-armed yoke member revolvably supported within said first named yoke and having its arms pivotally connected to the arms of the first named yoke with the axis of said pivot horizontal and laterally offset from the bridge portion connecting said arms; means for detachably securing a power driven tool assembly to the bridge portion of said second yoke and in spaced relation with the arms thereof; clamp means for clamping said yokes in a preselected angularly adjusted position; and separate clamp means coacting with the pintle of said first named yoke and with the ram for clamping said first named yoke firmly to the ram as to be movable therewith as a single unit.

4. In a machine tool the combination of a standard having a four cornered head member having substantially the form of an open-topped channel; an elongated tool carrier member translatably supported on the head member within the channel; roller bearing guide means journaled in the head member for the translatable member comprising four sets of roller bearings, one set in each corner of the head member and each set including two cooperating bearings arranged on axes mutually inclined with one roller of each set arranged to underlie and engage with an under surface of the translatable member and the other bearing of the set arranged to overlie and engage a complementally inclined upper surface of the translatable member, the peripheries of said bearings forming a V-shaped opening for receiving a V portion of the translatable member; means exposed outwardly of said head member and mounting each of said roller bearings for adjustment laterally of its axis toward or away from the respective mutually inclined surfaces of the translatable member thereby to effect a raising or lowering of the V-shaped opening and of the translatable member or a shifting thereof laterally relative to the medial plane of said head member; and means exposed outwardly of said head member to clamp each roller bearing in adjusted position.

5. A radial machine tool combining a base; an upstanding column at one end thereof; a normally stationary head member mounted at the top of said column, said head member being generally T-shaped with up turned spaced walls extending along the top of the T; inwardly facing and independently adjustable bearing means in each extending arm of said T-shaped head, said bearing means being laterally adjustable relative to said head; a translatable ram member having complemental bearing surfaces slidably mounted between the upstanding walls of and engaging the said laterally adjustable bearings in said stationary head, said ram member being reciprocable on a line determined by the laterally adjusted position of the bearing means in said head; a power driven tool mounted to said ram for reciprocation laterally over said base when the ram is shifted along said bearing means in the head; clamp means for clamping the reciprocable ram to said stationary head in a selected position thereby to secure said tool in a selected position over said base, said clamp means comprising a pair of axially adjustable clamp shoes journaled in said head on an axis underlying the said reciprocable ram and transversely to the longitudinal axis of the latter, each of said shoes having an upwardly extending portion arranged to engage the outer side of the ram; manually operable means for actuating said clamp shoes in a clamping direction to effect clamping action of said upward extending portions of the shoes with the outer sides of the ram irrespective of the lateral position of said ram in said head as a result of a lateral shift in position of one or more of the bearing means in the head.

6. In a machine tool the combination of an elongated reciprocable member, a tool carried thereby, a support for said shiftable member including therein relatively adjustable guide means for the member, means for adjusting said guide means laterally relative to the support thereby to effect an adjustment in a lateral direction in the line of reciprocation of said member and tool carried thereby relative to said support, means for reciprocating said member along said guide means comprising a screw shaft element rotatably and relatively non-translatably journaled to said reciprocable member and a non-rotatable nut member supported by said support, and means mounting said nut member for lateral adjustment relative to the support to maintain same in cooperative axial alignment with said screw shaft carried on said laterally adjustable reciprocable member when the latter is adjusted laterally in said support as an incident to adjusting said guide means laterally.

WILLIAM FERDINAND OCENASEK.